(12) United States Patent
Galic

(10) Patent No.: US 8,410,742 B2
(45) Date of Patent: Apr. 2, 2013

(54) OPERATING A SYNCHRONOUS MOTOR HAVING A PERMANENT MAGNET ROTOR

(75) Inventor: Johann Galic, Surahammar (SE)

(73) Assignee: Bombardier Transportation GmbH, Berlin (DE)

( * ) Notice: Subject to any disclaimer, the term of this patent is extended or adjusted under 35 U.S.C. 154(b) by 203 days.

(21) Appl. No.: 13/057,819

(22) PCT Filed: Aug. 7, 2009

(86) PCT No.: PCT/EP2009/005894
§ 371 (c)(1),
(2), (4) Date: Mar. 8, 2011

(87) PCT Pub. No.: WO2010/015424
PCT Pub. Date: Feb. 11, 2010

(65) Prior Publication Data
US 2011/0162554 A1   Jul. 7, 2011

(30) Foreign Application Priority Data
Aug. 7, 2008   (EP) .................................... 08014129

(51) Int. Cl.
H02P 27/00 (2006.01)
H02P 21/00 (2006.01)
H02P 7/00 (2006.01)
H02P 27/04 (2006.01)

(52) U.S. Cl. .................... 318/700; 318/400.02; 318/432; 318/434; 318/494; 318/554; 318/555; 318/800

(58) Field of Classification Search ............. 318/400.02, 318/432, 434, 494, 554, 555, 700, 800
See application file for complete search history.

(56) References Cited

U.S. PATENT DOCUMENTS
6,002,234 A * 12/1999 Ohm et al. ................ 318/729
7,586,286 B2 * 9/2009 Cheng et al. ............. 318/807
(Continued)

FOREIGN PATENT DOCUMENTS
JP    10014273 A    1/1998
JP    11299297 A    10/1999

OTHER PUBLICATIONS
Ghassemi et al., "A very fast direct torque control for interior permanent magnet synchronous motors start up", Energy Conversion and Management, 2005, pp. 715-726, 46.

(Continued)

Primary Examiner — Walter Benson
Assistant Examiner — Gabriel Agared
(74) Attorney, Agent, or Firm — The Webb Law Firm (57) ABSTRACT

A method of operating a synchronous motor having a stator that includes a set of electromagnets and a permanent magnet rotor. The synchronous motor is controlled by calculating in a flux controller a measure of a flux magnitude, which is the magnitude of the stator flux of the motor and by calculating in a load angle controller a measure of a load angle. Information about a desired motor torque or a reduced motor torque, which is smaller than the desired motor torque, is input to the load angle controller and the load angle controller calculates the measure of the load angle depending on the input motor torque. The measure of the flux magnitude is combined with the measure of the load angle to obtain commands for controlling electric currents of electromagnets of the stator, thereby directly controlling the stator flux. A flux limit value, which depends on a predetermined maximum value of the stator flux allowed for the motor which depends on a maximum value of an electric voltage, which is used to drive the currents through the stator electromagnets and which depends on the actual rotor speed, is repeatedly calculated. During acceleration of the rotor while the stator flux is smaller than the maximum flux allowed for the motor the measure of the flux magnitude is calculated depending on the output of a predetermined function. The output of the predetermined function depends on the desired motor torque and corresponds to the magnitude of the stator flux.

12 Claims, 5 Drawing Sheets

U.S. PATENT DOCUMENTS

| | | | |
|---|---|---|---|
| 7,746,039 B2* | 6/2010 | Hoffmann et al. | 322/89 |
| 2004/0036434 A1* | 2/2004 | Chen et al. | 318/432 |
| 2004/0257028 A1 | 12/2004 | Schulz et al. | |
| 2006/0055363 A1 | 3/2006 | Patel et al. | |
| 2008/0030155 A1* | 2/2008 | Patel et al. | 318/400.02 |
| 2008/0136380 A1* | 6/2008 | Hoffmann et al. | 322/29 |
| 2008/0303475 A1* | 12/2008 | Patel et al. | 318/634 |
| 2010/0060223 A1* | 3/2010 | Sakai et al. | 318/494 |
| 2010/0327585 A1* | 12/2010 | Cao et al. | 290/44 |

OTHER PUBLICATIONS

Swierczynski et al., "DSP Based Direct Torque Control of Permanent Magnet Synchronous Motor (PMSM) Using Space Vector Modulation (DTC-SVM)", IEEE, 2002, pp. 723-727.

Luukko et al., "Limitation of the Load Angle in a Direct-Torque-Controlled Synchronous Machine Drive", IEEE Transactions on Industrial Electronics, Aug. 2004, pp. 793-798, vol. 51, No. 4.

* cited by examiner

OPERATING A SYNCHRONOUS MOTOR HAVING A PERMANENT MAGNET ROTOR

BACKGROUND OF THE INVENTION

1. Field of the Invention

The invention relates to a method of operating a synchronous motor having a stator comprising a set of electromagnets and having a permanent magnet rotor. Such a motor is often called permanent magnet synchronous motor (PMSM). The invention further relates to an arrangement for operating such a motor. A particular field of interest is the control of a PMSM which is a propulsion motor of a rail vehicle.

2. Description of Related Art

Typically, asynchronous motors having a rotor with at least one electromagnet are used for propulsion of rail vehicles. The term "rail vehicles" includes any track-bound vehicle. These asynchronous motors can easily be controlled, since not only the electromagnets of the stator, but also the electromagnet or electromagnets of the rotor can be adapted to the desired operational behaviour. However, PMSM motors have some advantages. Especially, the power density (the achievable power per volume) is high and the energy losses are low. On the other hand, as mentioned, the control of a PMSM is more difficult, if a fast response of the motor is required in dynamic situations and if efficient use of resources (in particular available electric voltage and energy) is of importance.

Usually, there are limits for the operation parameters of the motor. Some of the limits may depend on the operation state, some of the limits are fixed for the motor. In particular, these limits are: a maximum value of the stator flux allowed for the motor, the value of the electric voltage which is used to drive the currents through the stator electromagnets, a maximum value for these currents which is allowed and the maximum allowed torque which is allowed for the motor.

SUMMARY OF THE INVENTION

It is an object of the present invention to provide a method and an arrangement of the type mentioned above in order to control a PMSM in an efficient manner. In particular, different operating states, such as operating states where limits for the operation parameters of the motor are reached, are to be handled.

It is a basic idea of the present invention to use a direct stator flux control. An advantage of such a flux control is that the maximum available voltage can be used to drive the stator currents and that the motor shows a good dynamic behaviour. For example, a DC to AC converter which is used to drive the stator currents of the motor may be operated by way of the so-called six step operation (i.e. in hex mode) to achieve the maximum available voltage. In this case, each phase of the inverter generates a voltage having the time behaviour of a square shaped wave at the motor. In this mode, the voltage amplitude at the motor is the maximum possible and only the frequency and phase of the voltage can be controlled. This mode is used for speeds higher than the base speed. The base speed is the speed of the rotor when the maximum possible flux is equal to the maximum allowed flux.

According to a further basic idea of the invention, the minimum size of the electric current through the stator electromagnets which is needed to achieve a desired torque is used to drive the motor. Especially, this applies to the acceleration of the rotor, for example while the rail vehicle is accelerated from stand still to cruising speed.

According to the preferred embodiment of the invention which will be described in the following, a desired torque may be input to the motor control structure. The desired motor torque may, for example, be chosen by the driver of the rail vehicle, or it may be output by an automatic control system to the control structure. Further input variables to the control structure may be: the maximum allowed stator flux of the motor, the maximum available electric voltage for driving the currents through the stator electromagnets, the motor speed which is given by the rotational speed of the rotor, the maximum load angle, which is the angle between the stator flux and the rotor flux referred to the axis of rotation of the rotor, and/or the maximum value of the currents through the stator electromagnets. The control structure may produce a voltage signal which may be input to a modulator and the modulator may control a device for directly controlling the switches of an inverter which inverts a direct current driven by the available voltage to alternating currents through the electromagnets of the motor. The control device which directly controls the inverter may be operated on the basis of a space vector modulation (SVM). However, other methods for using the output of the control structure in order to drive the motor are also possible.

A basic concept of the invention is to use a flux controller for controlling the magnitude of the stator flux of the motor and, in parallel to the flux controller, to use a load angle controller for controlling the load angle between the stator flux and the rotor flux. The flux controller may output a measure of the flux magnitude which should be produced. The measure of the flux magnitude may be in the standard d-q-coordinate system of the stator flux, a voltage in the direction of the stator flux magnitude. On the other hand, the measure of the load angle controller which is produced by the load angle controller to drive the load angle and, thereby, to drive the torque of the motor may be a voltage orthogonal to the voltage in the direction of the stator flux magnitude. Examples will be given in the description of the figures. The measure of the flux magnitude which is produced by the flux controller and the measure of the load angle which is produced by the load angle controller, are preferably combined to produce the mentioned reference signal or, more particularly speaking, the voltage reference.

According to one feature of the present invention, information about the desired torque is input to the flux controller and to the load angle controller. However, the information about the desired torque is not directly used by the flux controller and is not directly used by the load angle controller in all situations. The term "information about the desired torque" includes the case that the input signal to the controller corresponds to the difference between the reference value (the desired torque) and the actual value (the actual torque), i.e. the information may be the difference. In order to simplify the wording in the following "the desired torque" may be used instead of "information about the desired torque", To produce an input for the flux controller, which is directly used by the flux controller, two operations may be performed. According to one operation, a predetermined function is applied. The desired torque is the input to the predetermined function and the predetermined function outputs a value which corresponds to the magnitude of the stator flux which results in the desired motor torque using the minimum possible stator current. In other words, this predetermined function makes sure that the minimum possible stator current is used to produce the desired torque.

However, this first operation is not performed in all operational situations of the motor or the result of this first operation is not directly used by the flux controller in all situations. Rather, according to a second operation, a flux limit value of the stator flux is repeatedly calculated and, if the stator flux has reached the flux limit value, a value is input to the flux controller which is directly used by the flux controller, this value corresponds to the flux limit value, thereby keeping the stator flux to the limit value.

According to the second operation, the desired torque is limited to a reduced value by a limiting function. This limiting function may limit the desired torque for one or for both of the following reasons: the maximum allowed current through the electromagnets of the stator may be reached and/or the maximum allowed torque of the motor may be reached. The limiting function guarantees that the respective maximum value is not exceeded by limiting the desired torque to the limited torque which is input to the load angle controller. Again, the actual input signal may represent the difference between the reference value and the actual value.

In particular, the following is proposed:

A method of operating a synchronous motor having a stator comprising a set of electromagnets and having a permanent magnet rotor (i.e. a permanent magnet or a set of permanent magnets is used to produce the magnetic rotor flux). The synchronous motor is controlled by calculating in a flux controller a measure of a flux magnitude, which is the magnitude of the stator flux of the motor, and by calculating in a load angle controller a measure of a load angle, which is the angle between the stator flux and the rotor flux referred to the axis of rotation of the rotor. A desired motor torque or a reduced motor torque, which is smaller than the desired motor torque, is input to the load angle controller, wherein the load angle controller calculates the measure of the load angle depending on the input motor torque. The measure of the flux magnitude and the measure of the load angle are combined to obtain a signal which is to be used to obtain commands for controlling electric currents of electromagnets of the stator, thereby directly controlling the stator flux.

Furthermore, as an optional step, a flux limit value which depends on a predetermined maximum value of the stator flux allowed for the motor (in the following: "maximum allowed flux" or "maximum flux allowed for the motor"), which depends on a the value of an electric voltage, which is used to drive the currents through the stator electromagnets, and which depends on the actual rotor speed, is repeatedly calculated. In particular, the flux limit value corresponds to the maximum allowed value of the stator flux at motor speeds below the base speed. At higher motor speeds, the flux limit value corresponds to the maximum achievable flux (also called: the maximum possible flux) which depends on the voltage and speed.

During acceleration of the rotor while the stator flux is smaller than the maximum flux allowed for the motor the following is performed:
  calculating the measure of the flux magnitude depending on the output of a predetermined function, wherein the output of the predetermined function depends on the desired motor torque and corresponds to the magnitude of the stator flux, which results in the desired motor torque using the minimum possible stator current, and
  calculating the measure of the load angle depending on the desired motor torque.

Optionally, during further acceleration of the rotor when the stator flux has reached the maximum allowed flux, the following is performed:
  calculating the measure of the flux magnitude corresponding to the flux limit value (which is here the maximum allowed flux), and
  calculating the measure of the load angle depending on the desired motor torque As a result, the stator flux will be limited to the flux limit value which is here the maximum allowed flux. Furthermore, since the desired motor torque is increasing, the load angle is also increasing. However, this optional step may not be performed if the magnitude of the electric currents through the electromagnets of the stator has reached a predetermined maximum value when or before the flux limit value is reached.

A corresponding arrangement for operating a synchronous motor having a stator comprising a set of electromagnets and having a permanent magnet rotor, comprises:
  a flux controller for controlling the motor by calculating a measure of a flux magnitude, which is the magnitude of the stator flux of the motor,
  a load angle controller for controlling the motor by calculating a measure of a load angle, which is the angle between the stator flux and the rotor flux referred to the axis of rotation of the rotor,
  the load angle controller comprising an input for receiving information about a motor torque, which is a desired motor torque or a reduced motor torque that is smaller than the desired motor torque, and wherein the load angle controller is adapted to calculate the measure of the load angle depending on the input motor torque,
  a combination device for combining the measure of the flux magnitude and the measure of the load angle to obtain a signal which is to be used to obtain commands for controlling electric currents of electromagnets of the stator, thereby directly controlling the stator flux,
  a flux limit calculating device for repeatedly calculating a flux limit value which depends on a predetermined maximum value of the stator flux allowed for the motor, which depends on a maximum value of an electric voltage, which is used to drive the currents through the stator electromagnets, and which depends on the actual rotor speed,
  wherein the arrangement is adapted in order to accelerate the rotor while the stator flux is smaller than the flux limit value:
    calculating the measure of the flux magnitude depending on the output of a predetermined function, wherein the output of the predetermined function depends on the desired motor torque and corresponds to the magnitude of the stator flux, which results in the desired motor torque using the minimum possible stator current, and
    calculating the measure of the load angle depending on the desired motor torque.

The arrangement may be adapted in order to further accelerate the rotor when the stator flux has reached the flux limit value,
  calculating the measure of the flux magnitude corresponding to the flux limit value, and
  calculating the measure of the load angle depending on the desired motor torque,
so that the stator flux is limited to the flux limit value (which is here the maximum allowed flux) and, furthermore, since the desired motor torque is increasing, the load angle is also increasing. This corresponds to the optionally performed method step described above.

Since the minimum possible stator current is used to produce the desired motor torque, while the stator flux has not reached the maximum value, the dynamic behaviour of the motor control is excellent and the available electric energy is efficiently used. When the stator flux has reached its maximum value, the stator current is still as small as possible, since the stator flux is kept at its limit value and the desired torque is produced by increasing the load angle.

Preferably, when the magnitude of the electric currents through the electromagnets of the stator have reached a predetermined maximum value and when the motor is to be further accelerated the following is performed:

the measure of the load angle is calculated depending on the reduced motor torque, so that the electric currents continuously match the predetermined maximum value and so that the load angle is increasing while the stator flux is decreasing.

The phase, when the magnitude of the electric currents through the electromagnets of the stator has reached a predetermined maximum value and when the motor is to be further accelerated, can alternatively be defined by the concept that the stator flux is kept at the maximum possible flux (which depends on the available voltage and on the rotor speed).

The current limitation is preferably performed by the limiting function described above which limits the desired torque to the limited torque. Again, the use of energy is efficient and a very good dynamic behaviour of the control is achieved by increasing the load angle.

In some situations, the motor torque may reach its maximum value. In these situations, preferably the following is performed in order to further accelerate the rotor: The measure of the load angle is calculated depending on the reduced motor torque, wherein the reduced motor torque is limited to the predetermined maximum value so that the electric currents are decreasing and so that the stator flux is decreasing.

When the stator flux has been reduced as described above while the rotor is accelerated, the desired torque may decrease, for example because the driver of the rail vehicle reduces the desired torque. However, despite the reduced torque, a further acceleration of the rotor may be required for some time. It is proposed for such a situation, that:

the measure of the flux magnitude is calculated so that it is equal to the flux limit value (e.g. the flux is nearly constant, it may slightly decrease or increase depending on the driving conditions), and the measure of the load angle is calculated depending on the desired motor torque, so that the stator flux is limited to the flux limit value and the load angle is decreasing.

This phase can also be characterised by the concept that the stator flux is kept at the maximum possible flux (which depends on the available voltage and on the rotor speed).

This may return the operation state to a situation in which the measure of the flux magnitude can be calculated on the basis of the predetermined function mentioned above which guarantees that the desired motor torque is produced using the minimum possible stator current, wherein the measure of the load angle may be calculated directly on the basis of the desired motor torque.

BRIEF DESCRIPTION OF THE DRAWINGS

Preferred examples of the present invention will be described with reference to the attached figures in the following. The figures show:

FIG. 1 an arrangement comprising a preferred control structure and devices for receiving the output of the control structure and for directly controlling the motor, FIG. 2 a diagram showing a torque demand and the rotor speed as time dependent functions for a situation, where the motor is accelerated, FIG. 3 the stator flux path in a q-d stator flux coordinate system corresponding to the situation shown in FIG. 2, FIG. 4 an other diagram similar to the diagram shown in FIG. 2 for a different situation, while the rotor is accelerated, and FIG. 5 the stator flux path corresponding to the situation shown in FIG. 4, FIG. 6 a schematic diagram showing a permanent magnet rotor rotating within the stator of a motor and FIG. 7 a diagram illustrating different notations of angles and coordinate axes.

DETAILED DESCRIPTION OF THE PRESENT INVENTION

The following example applies to a motor where the inductance of the stator electromagnets is independent of the current through the electromagnet. The formulas given are therefore simpler than in other situation in practice.

Figure 6:
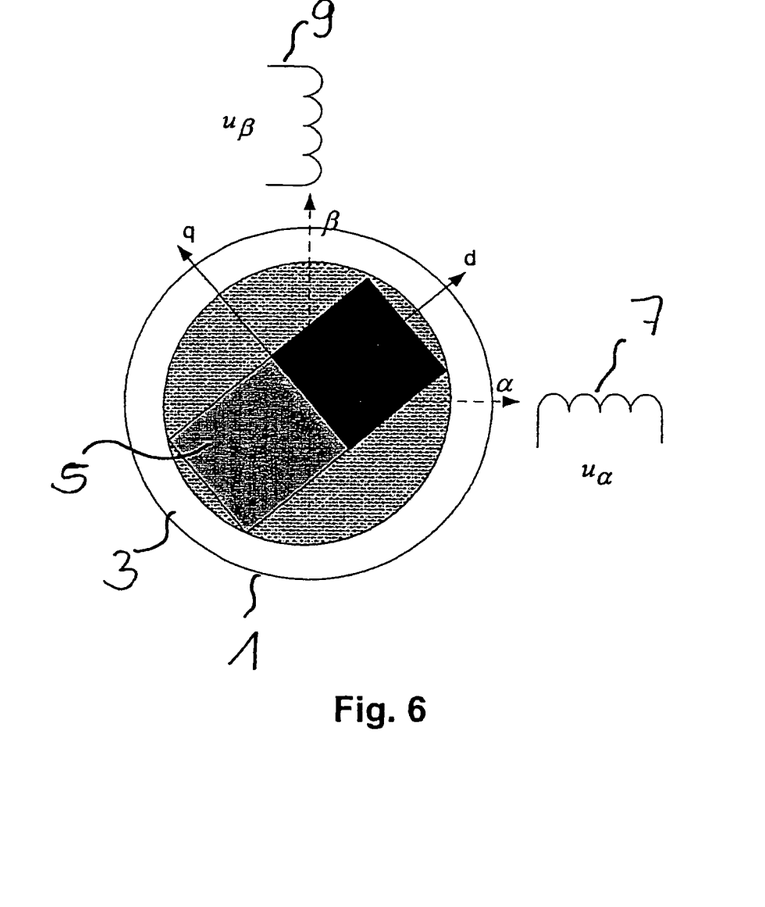

FIG. 6 shows schematically a permanent magnet synchronous motor 1 having a stator 3 and a rotor 5. The magnetic flux of the stator 3 is produced, for example by two electromagnetic coils 7, 9 which are perpendicularly oriented to each other. Coil 7 is oriented in the direction of the coordinate axis α of a non-rotating coordinate system. Coil 9 is oriented in the direction of the other coordinate axis β of the non-rotating coordinate system.

The permanent magnet of rotor 5 produces a magnetic flux which is oriented in the direction d of a rotating coordinate system, the rotational speed of the rotating coordinate system being the rotation speed of the rotor 5. The other (orthogonal to d) coordinate axis of the rotating coordinate system is denoted by "q".

Figure 7:
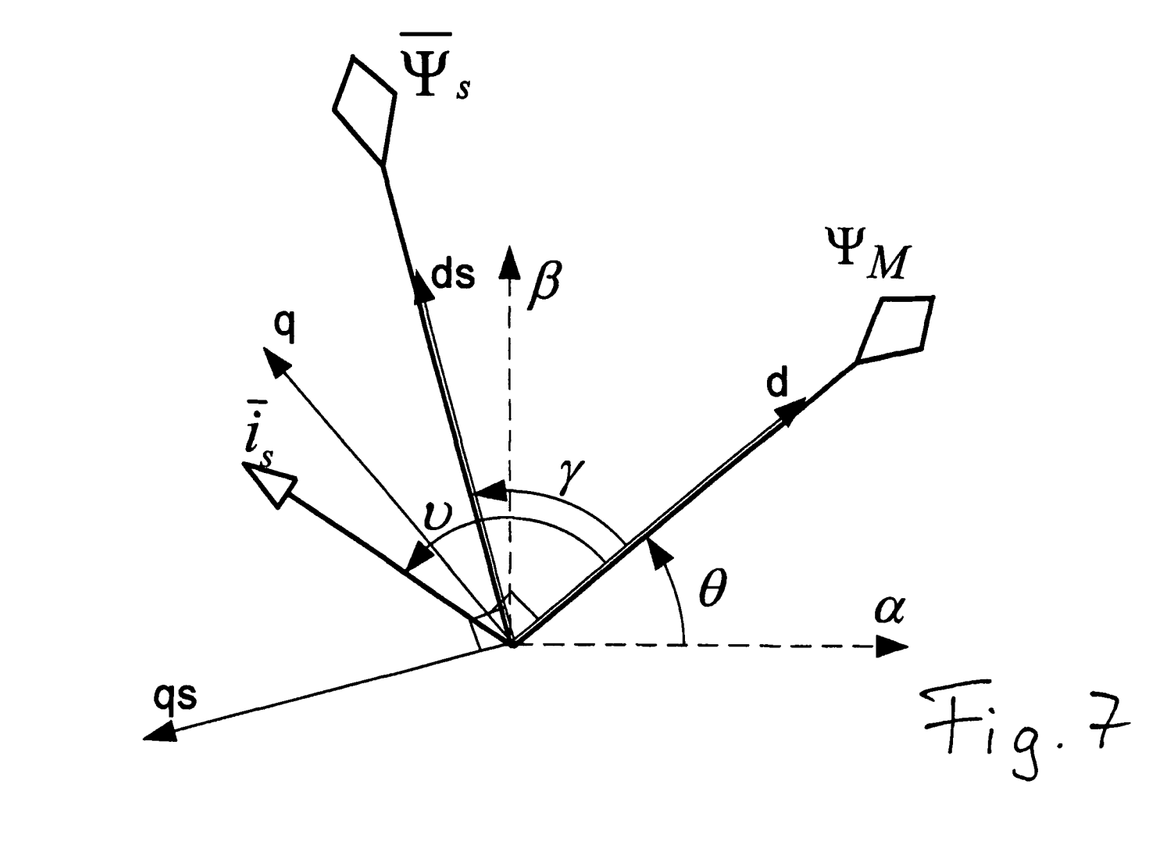

FIG. 7 illustrates some notations and will be referred to in the following.

FIG. 7 shows the situation of the rotating and of the non-rotating coordinate systems at a specific point in time which corresponds to the situation depicted in FIG. 6. The rotor flux $\Psi_M$ is always oriented in the direction of the coordinate axis d of the rotating coordinate system d-q. The angle between the coordinate axis α of the non-rotating coordinate system α-β and the coordinate axis d is denoted by Θ. Regarding the non-rotating coordinate system, the frequency of the stator voltage (and the same applies to the frequency of the stator current) is proportional to the first time derivative of the angle Θ. If the pole number of the motor is 2, the frequency of the stator voltage is equal to the first time derivative of the angle Θ.

The angle between axis d and the magnetic stator flux $\overline{\Psi}_S$ is denoted by γ. The angle between coordinate axis d and the stator current $\overline{I}_S$ is denoted by ν. The coordinate axis ds ("ds" in FIG. 7) is always in line with the stator flux vector $\overline{\Psi}_S$. The coordinate axis qs ("qs" in FIG. 7) is orthogonal to ds which means that ds and qs define a coordinate system which is related to the stator flux. The stator current can be written in the d-q coordinate system as:

$$\overline{I}_S = i_d + j \cdot i_q \qquad \text{Eq. 1}$$

in complex form. The corresponding complex form of the stator flux $\overline{\Psi}_S$ is:

$$\overline{\Psi}_S = \Psi_M + L_d i_d + j \cdot L_q i_q \qquad \text{Eq. 2}$$

wherein $i_d$ is the component of the stator current in the direction of coordinate axis d, $i_q$ is the component of the stator current in the direction of coordinate axis q, j is the complex unit $j^2 = -1$, $L_d$ is the magnetic inductivity of the stator electromagnets in the direction of coordinate axis d and $L_q$ is the magnetic inductivity of the stator electromagnets in the direction of axis q. The torque of the motor is given by:

$$T = \overline{\Psi} \times \overline{I}_s = \Psi_d i_q - \Psi_q i_d \quad \text{Eq. 3}$$

wherein $\Psi_d$ and $\Psi_q$ are the components of the stator flux in the rotating coordinate system d-q and wherein the $\overline{I}_S$ of the stator flux $\overline{\Psi}$ has been removed for simplicity. In other form, the torque can be written as:

$$T = \Psi_M I \sin(\nu) + \frac{1}{2}(L_d - L_q)I^2 \sin(2\nu) \quad \text{Eq. 4}$$

wherein I is the amount of the stator current $\overline{I}_S$. The maximum torque to current ratio can be found (provided that the current magnitude, i.e. the amount of the current I is constant) by calculating the derivative of the torque with respect to the angle $\nu$ and setting this derivative to zero: dT/d$\nu$=0. The corresponding value of the angle $\nu$ is denoted by $\nu_0$ in the following. The results of the cosine of the angle $\nu_0$, of the stator flux $\overline{\Psi}_0$ and of the torque $T_0$ are as follows:

$$\cos(\nu_0) = \frac{-\Psi_M + \sqrt{\Psi_M^2 + 8(L_d - L_q)^2 I^2}}{4(L_d - L_q)I} \quad \text{Eq. 5}$$

$$\Psi_0 = \Psi_M + L_d I \cos(\nu_0) + j L_q I \sin(\nu_0) \quad \text{Eq. 6}$$

$$T_0 = \Psi_M I \sin(\nu_0) + \frac{1}{2}(L_d - L_q)I^2 \sin(2\nu_0) \quad \text{Eq. 7}$$

Figure 1:
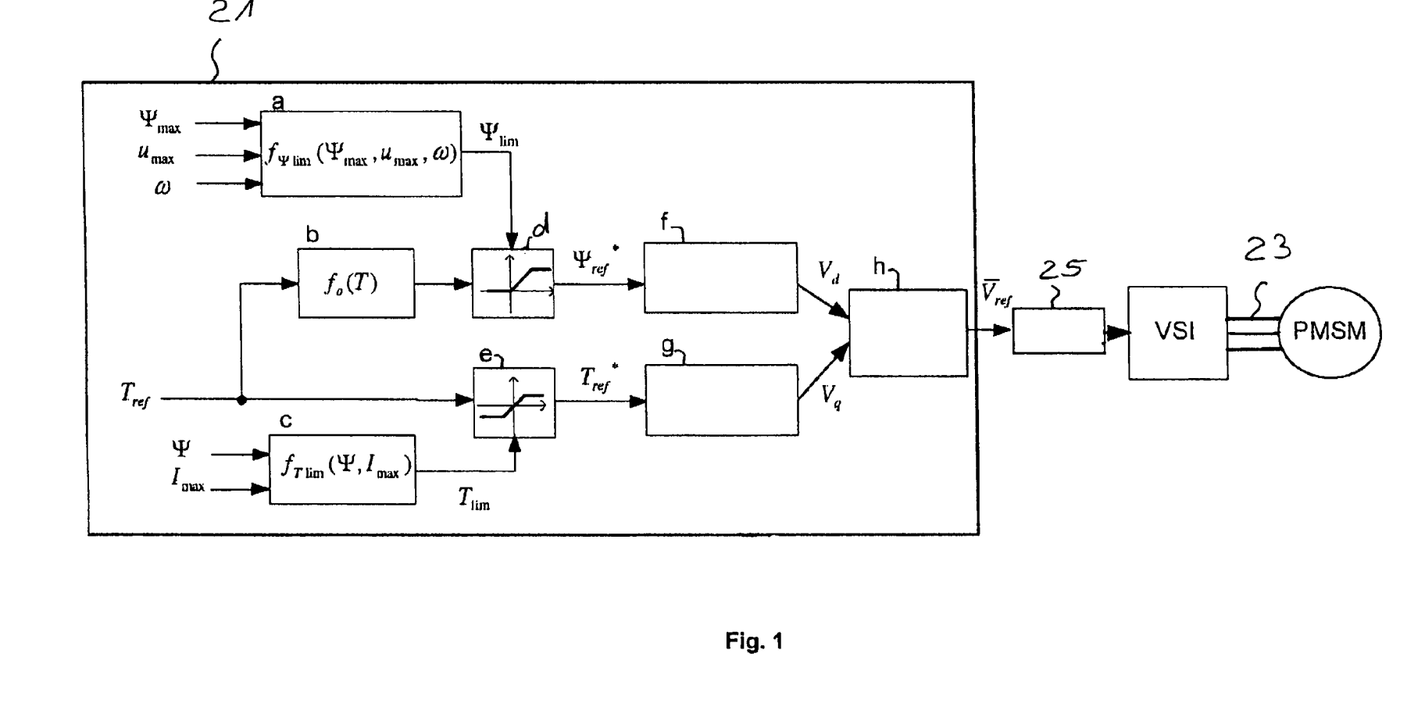

Thus, the optimum stator flux, i.e. the stator flux which corresponds to the maximum torque to current ratio, is a function of the torque:

$$\Psi_0 = f(T_0, \Psi_M, L_d, L_q) \quad \text{Eq. 8,}$$

wherein $f$ represents "function". This function, which can be calculated using the equations given above, can be implemented in device b which is shown in FIG. 1 (which will be described below) and is a preferred embodiment of the predetermined function mentioned above in the general description of the invention.

The flux vector can be calculated from a given current and flux magnitude, e.g. by using the following equations 9a and 9b:

$$\Psi_d = \frac{L_q^2 \Psi_M - L_d L_q \sqrt{(L_q^2 - L_d^2)I^2 + \left(\frac{L_d^2}{L_q^2} - 1\right)|\Psi|^2 + \Psi_M^2}}{L_q^2 - L_d^2} \quad \text{Eq. 9a}$$

$$\Psi_q = \sqrt{|\Psi|^2 - \Psi_d^2} \quad \text{Eq. 9b}$$

The torque is given by the following equation:

$$T = \left(\frac{\Psi_d}{L_q} - \frac{\Psi_d - \Psi_M}{L_d}\right)\Psi_q \quad \text{Eq. 10}$$

From equations 9 and from equation 10 a limit value of the torque which corresponds to the limit value of the current, i.e. the maximum current through the stator electromagnets, can be calculated and can be, for example, stored in a look-up table. Generally speaking, this torque limit is a function of the amount of the stator flux, the maximum current, the rotor flux and of the complex inductivity in the d-q coordinate system of the magnetic inductivity of the stator electromagnets.

In many cases there is a maximum allowed torque for a specific motor which can be called "pull out" torque and the magnetic stator flux in the d-q rotating coordinate system can be calculated using the following equations:

$$\Psi_{d_{pull}} = \frac{L_q \Psi_M - \sqrt{L_q^2 \Psi_M^2 + 8|\Psi|^2(L_d - L_q)^2}}{4(L_q - L_d)} \quad \text{Eq. 11a}$$

$$\Psi_{q_{pull}} = \sqrt{|\Psi|^2 - \Psi_{d_{pull}}^2} \quad \text{Eq. 11b}$$

The corresponding pull out load angle can then be calculated from the following equation:

$$\gamma_{pull} = f_{pull}(\Psi) = a\tan\left(\frac{\Psi_{q_{pull}}}{\Psi_{d_{pull}}}\right) \quad \text{Eq. 12}$$

and the pull out torque is given by:

$$T_{pull} = \left(\frac{|\Psi|\cos(\gamma_{pull})}{L_q} - \frac{|\Psi|\cos(\gamma_{pull}) - \Psi_M}{L_d}\right) \cdot |\Psi|\sin(\gamma_{pull}) \quad \text{Eq. 13}$$

Therefore, the pull out torque is a function of the amount of the stator flux, of the amount of the rotor flux and of the magnetic inductivity of the stator electromagnets in the complex form written in the rotating coordinate system d-q. Device c according to FIG. 1, which is a preferred embodiment of the limiting device for calculating the reduced motor torque mentioned in the general description of the invention may be adapted to either output the pull out torque according to equation 13 or the torque which corresponds to the current limit according to equation 10, whichever torque is smaller.

Device c can be omitted and it can be prevented by other means that the desired torque does not exceed the maximum allowed torque. For example, other parameters and/or quantities which influence the motor control may be limited with the effect that the maximum allowed motor torque is never exceeded. A special limiting device is therefore not necessarily required.

When the maximum allowed stator flux of the motor is reached, the torque is controlled by setting the load angle, i.e. controlling the load angle by the load angle controller according to the present invention. When the rotor speed increases, i.e. the rotor is accelerated, the maximum electric voltage which can be used to drive the stator electromagnet currents limits the flux and the stator flux will, therefore, decrease. Also in this situation, where the flux is limited by the maximum available voltage, the torque is controlled using the load angle as a controlled variable. Device a of FIG. 1 (see below) which calculates a limit value of the stator flux, may be adapted to perform the two different limiting functions in these situations. Device a may output the minimum value of the maximum allowed stator flux or the maximum available voltage divided by the rotor speed and multiplied by a constant K, whichever value is smaller:

$$f_{\Psi lim} = \min\left(\Psi_{max}, K\frac{u_{max}}{\omega}\right) \qquad \text{Eq. 14}$$

FIG. 1 shows a control structure 21 for controlling a permanent magnet synchronous motor PMSM which may be a three-phase alternating current motor as indicated by three lines 23. The motor PMSM is directly controlled using space vector modulation SVM, according to this particular example of the invention. The SVM is performed by device VSI using a standard direct to alternating current converter, i.e. an inverter, which may have three branches with, in each case, two semiconductor switches which are connected in series to each other. The commands for switching the semiconductor switches are produced in device VSI. However, the device VSI is controlled by the output of a modulator 25 which may function in a manner which is principally known in the art.

However, the method how the signal at the input of the modulator 25 is calculated, is subject to the invention. For example, the control structure 21 outputs a reference voltage $\overline{V}_{ref}$ which is received by combining (in combining device h) output signals of a flux controller $f$ and of a load angle controller g which are connected parallel to each other. The output of the combination device h ($\overline{V}_{ref}$) is a voltage reference given in the fixed, non-rotating coordinate system α-β. It can i.e. be calculated as follows:

$$\overline{V_{ref}} = (V_d + jV_q) \cdot e^{j(\theta+\gamma)}$$

The input voltages $V_d$ and $V_q$ are given in the rotating stator flux coordinates (ds-qs, see above FIG. 7).

According to the embodiment described here, the flux controller $f$ receives a reference value $\Psi^*_{ref}$ as an input value and operates on the basis of this input value. As mentioned above, the reference value $\Psi^*_{ref}$ may be input to the flux controller $f$ in the form of the difference between the reference value and the actual value of the flux. The flux controller may be, for example, a PI (proportional, integral) controller and may output a voltage $V_d$ which represents a reference voltage in the direction of the stator flux, i.e. in the direction of the coordinate axis ds (see FIG. 7 for the definition of ds) of the rotating coordinate system. Preferably, the control method is performed using the coordinates of the system ds and qs (see above description of FIG. 7).

The load angle controller g receives a signal $T^*_{ref}$ as an input value and calculates on this basis a reference voltage $V_q$ as an output, wherein this reference voltage $V_q$ corresponds to a voltage controlling the component of the stator flux perpendicular to the coordinate axis qs (which is perpendicular to the direction of the stator flux). Therefore, the reference voltage $V_q$ controls the load angle between the stator flux and the rotor flux. Again, the information about the torque reference value $T^*_{ref}$ may be input to the load angle g in the form of the difference between the reference value $T^*_{ref}$ and the actual value of the torque.

The flux reference value $\Psi^*_{ref}$, which is input to the flux controller $f$, is output from a combination device d. If the stator flux is limited by limiting device a (the function of this device a was described above), the limited output value $\Psi_{lim}$ is output by the combination device d as the reference value $\Psi^*_{ref}$. In all other situations, the combination device d outputs the functional value of device b (the function of which was described above) as the reference value $\Psi^*_{ref}$. The device b receives the desired torque $T_{ref}$ as an input value and calculates its output value on the basis of equation 8 and the preceding equations 5-7 for example.

The desired torque $T_{ref}$ is also input to a further combination device e which either outputs the desired torque as the reference torque value $T^*_{ref}$ or the output $T_{lim}$ of device c, the function of which was described above. Device c receives the actual value of the stator flux and the maximum value of the stator current. Device c may be operated according to equations 9-13, as described above.

Device a receives the maximum allowed stator flux, the maximum available voltage to drive the stator currents and the actual speed of the rotor.

In order to describe the leakages of the control structure 21: The limiting device a comprises an input for receiving the maximum allowed stator flux, the maximum available voltage and the actual rotor speed. An output of the limiting device a is connected to the combination device d. Device b for calculating the functional value of the predetermined function mentioned above comprises an input for receiving the desired torque and comprises an output which is connected to an input of the combination device d. An output of the combination device d is connected to the flux controller $f$ in order to transfer the flux reference value $\Psi^*_{ref}$. An output of the flux controller is connected to the combination device h.

The combination device e comprises an input for receiving the desired torque $T_{ref}$ and comprises an input for receiving a torque limit value $T_{lim}$. This input is connected to an output of device c which has an input for receiving the actual stator flux magnitude and for receiving the maximum allowed current of the stator.

An output of the combination device e for outputting the reference torque value $T^*_{ref}$ is connected to an input of the load angle controller g. An output of the load angle controller g is connected to the combination device h.

Figure 2:
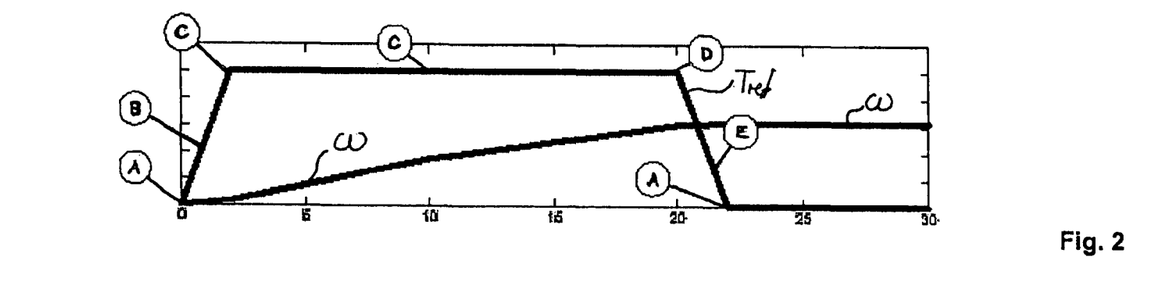
Figure 3:
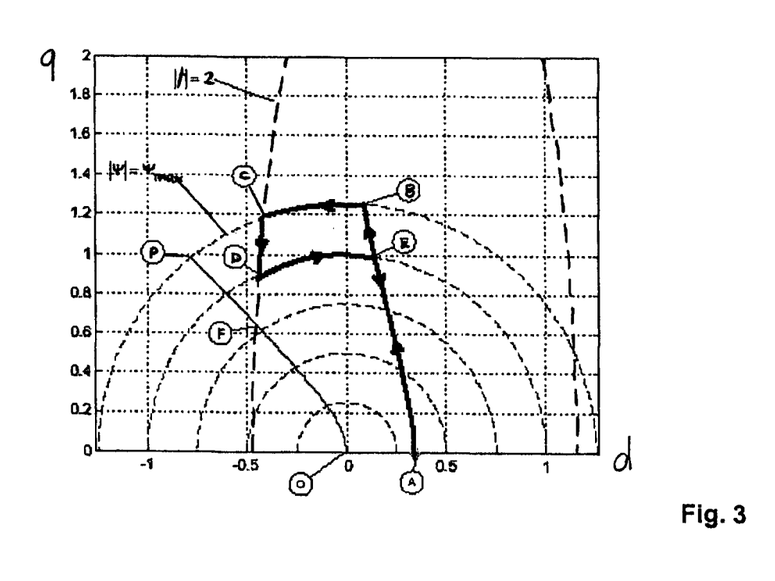

With reference to FIGS. 2 and 3 a first example of a motor operation during acceleration of the rotor is described. FIG. 2 shows the time axis as the horizontal axis of the diagram. For example, the unit of the time axis may be one second, i.e. the time axis starts at zero and ends at 30 seconds.

The vertical axis corresponds to the desired torque value $T_{ref}$ and to the rotor speed ω.

FIG. 3 shows the stator flux in the rotating d-q coordinate system. During the acceleration process of the rotor, the stator flux develops as shown on solid line and as indicated by six arrows. Certain points in time and the corresponding stator flux are denoted by letters A-E in FIG. 3. Corresponding times and values of the desired torque $T_{ref}$ are also indicated in FIG. 2. The course of the desired torque $T_{ref}$ in FIG. 2 has a trapezoidal form.

The acceleration process starts at stand still, for example when the rotor of the motor is not rotating or when the motor does not produce a torque. This is indicated by letter A. In the first phase of the acceleration process starting at time zero, the desired torque $T_{ref}$ is linearly increased. In the first part of this phase, the stator flux follows a nearly linear, but slightly bent line in the diagram of FIG. 3 from point A to B. Following this path, the q-component of the stator flux is increased from zero to a value of about 1.2. This means that the load angle is continuously increased according to the continuous increase of the desired torque $T_{ref}$. The characteristic feature of path A-B is that the location of this path in the stator flux diagram shown in FIG. 3 is given by the condition that the motor torque is produced by the minimum possible currents through the stator electromagnets wherein all these currents are driven by the same voltage. This is usually the case in standard systems for providing electro motors with energy from a direct current intermediate circuit using an inverter which inverts the direct current into the three phases of a three-phase alternating current system which is connected to the three phases of the motor. However, the invention is not restricted to a three-phases system.

Coming back to FIG. 1, path A-B in FIG. 3 is controlled by device b which outputs its functional value and this functional value is output by combination device d as the reference value $\Psi^*_{ref}$ to the flux controller. The load angle controller receives as input value the desired torque $T_{ref}$. The limiting devices a and c do not influence the output of the control structure during this phase of operation.

At point B in FIG. 2 and FIG. 3, the maximum allowed stator flux is reached. This happens at time t=1 in FIG. 2. In FIG. 3, the maximum allowed stator flux corresponds to the dashed circular line which is denoted by $|\Psi|=\Psi_{max}$.

Alternatively, according to another example of the invention, points B and C may be identical, i.e. path A-B in FIG. 3 would be followed directly by path C-D. This happens for example if the magnitude of the electric currents through the electromagnets of the stator has reached a predetermined maximum value when or before the maximum allowed state of flux is reached.

Since the desired torque $T_{ref}$ is still increasing until t=2 (see FIG. 2), the increased torque can not be achieved by further increasing the reference value $\Psi^*_{ref}$ which is the input value of the flux controller $f$ in FIG. 1. Rather, the limiting device a limits this reference value to the maximum possible value so that the maximum allowed stator flux $\Psi_{max}$ is not exceeded. In order to produce a motor torque which corresponds to the desired torque, the load angle controller g, which receives the desired torque as its reference value $T^*_{ref}$, outputs a control signal in order to increase the load angle. Correspondingly, the path B-C in FIG. 3 follows the circular line of the maximum allowed stator flux, thereby increasing the load angle, which is denoted in FIG. 7 γ. Therefore, in FIG. 7, the operation made by following path B-C is achieved by rotating the pointer denoted by $\overline{\Psi}_S$ in anti-clockwise direction so that the load angle γ is increased. Coming back to FIG. 1, the reference value $\Psi^*_{ref}$ which is the input value of the flux controller $f$ is, as mentioned, provided by the limit value $\Psi_{lim}$. On the other hand, the input value $T^*_{ref}$ which is the input value of the load angle controller g is equal to the desired torque value $T_{ref}$. Since the flux controller $f$ can not contribute to the desired increase of the motor torque, the load angle controller g will deliver the required output signal. For example, the load angle controller g is also a PI-controller. This means that the limiting device a passivates the function of the flux controller $f$. On the other hand, the limiting device c has no influence on the output of the control structure 21 in phase which corresponds to path B-C.

At point C the desired torque $T_{ref}$ reaches its maximum value and is kept constant in the following phase of operation. Therefore, the maximum allowed current through the electromagnets of the stator is reached. The corresponding line of the stator flux in FIG. 3 which corresponds to constant stator current is indicated |I|=2 and is a section of an ellipse. However, first, during the phase from t=2 to t=10 in FIG. 2, the stator flux is not decreasing, but is constant. Rather, since the torque is not to be increased, the stator flux can remain at point C, but the torque can accelerate the rotor at constant flux magnitude and at constant load angle.

Referring to the control structure 21 shown in FIG. 1, there is no operational difference between the preceding phase (path B-C) and the phase where the stator flux remains at point C, except that the limiting device c limits the torque to the actual value. However, this limitation has no effect as long as the desired torque also remains constant. In other words, the output $T_{lim}$ of limiting device c and the desired torque value $T_{ref}$ are equal. Consequently, combination device e outputs $T^*_{ref}$ which is also equal to these values.

At time t=10, the maximum voltage which is available to drive the currents through the stator electromagnets is reached and the stator flux is decreasing but is kept at maximum possible flux (which depends on the speed and the voltage). The corresponding path in FIG. 3 extends from C-D. Correspondingly, the rotor speed can not be increased at the same rate as before t=10. Consequently, limiting device c starts decreasing the limited torque $T_{lim}$ and combination device e outputs this limited torque as the reference torque $T_{ref}^*$. As a result, the stator flux is decreasing with increasing rotor speed, wherein limiting device c guarantees that the stator flux is kept on the line of the maximum stator current. As can be seen in FIG. 3, a slight increase of the load angle takes place on path C-D.

At point D, which corresponds to t=20 in FIG. 2, the desired torque is starting to decrease. Therefore, the combination device e outputs the reduced torque value $T_{ref}$ instead of the limited torque value $T_{lim}$ and the load angle controller d reacts by decreasing the load angle, while the stator flux magnitude is kept (by function a) at the limit (either the maximum allowed flux or the maximum possible flux whichever is smaller) by the flux controller $f$.

The phases from C-D and from D-E can be defined by the concept that the stator flux is kept at the maximum possible flux (which depends on the available voltage and on the rotor speed), i.e. the flux is as high as possible during these phases.

At point E, which corresponds to t=21.5 in FIG. 2, the stator flux reaches the path which is characterized by the condition that the torque can be produced by the minimum possible current through the stator electromagnets. At this point, the control structure 21 starts operating in the same manner as described above for path A-B, wherein the limiting devices a and c are not influencing the output of the control structure 21. Rather, device b influences flux controller $f$ so that flux controller $f$ reduces the stator flux on path E-A.

Figure 4:
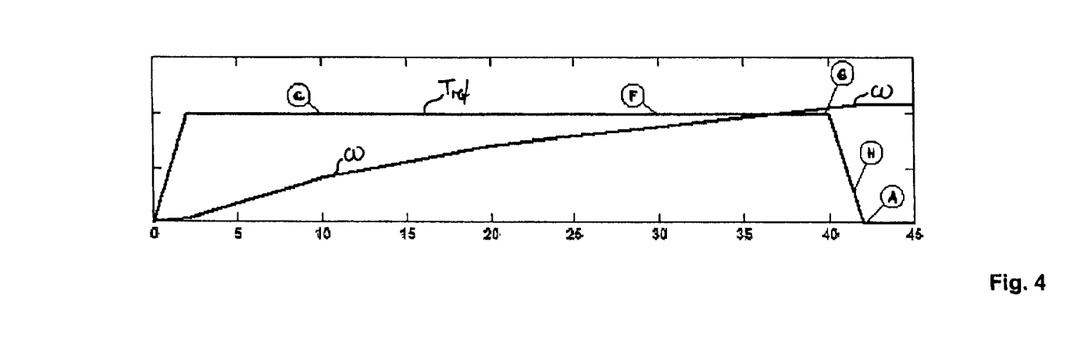
Figure 5:
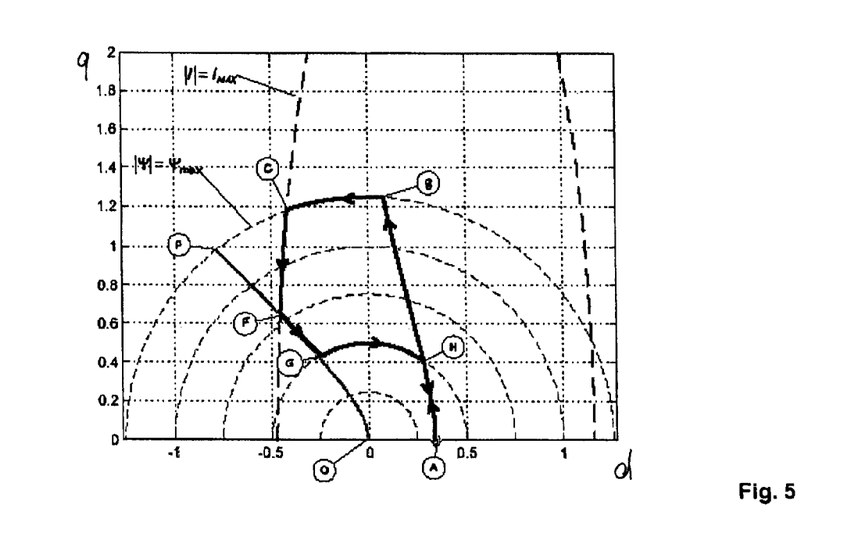

FIGS. 4 and 5 illustrate a similar acceleration process. However, the desired torque $T_{ref}$ is kept constant at its maximum value for a longer period of time, until t=40. Therefore, starting at point C in FIG. 5 (which is the same point as point C in FIG. 3) the stator flux is decreased on the path C-F in FIG. 5 instead of terminating at point D in FIG. 3. At point F, the stator flux reaches the line O-P which indicates the maximum allowed load angle of the motor. As a result, limiting device c starts further limiting the output value $T_{lim}$ at point F, which corresponds to t=30 in FIG. 4. The acceleration rate is further decreased as can be seen from FIG. 4 at t=30.

At point G the torque demand (i.e. the desired torque) is reduced so that the stator flux follows a line from point G-H. On this path, the stator flux is kept at the maximum possible flux (depending on speed and voltage). The function of the control structure 21 on path G-H is the same as for path D-E in FIG. 3, but on a smaller level of the stator flux magnitude.

At point H the stator flux has reached again the line from A-B which is characterized by the optimum torque to current ratio. The path from H-A is controlled in the same manner as described with reference to FIG. 2 and FIG. 3 for path E-A.

The invention claimed is:

1. A method of operating a synchronous motor having a stator comprising a set of electromagnets and having a permanent magnet rotor, the method comprising:
calculating in a flux controller a measure of a flux magnitude, which is a magnitude of a stator flux of the motor;
calculating in a load angle controller a measure of a load angle, which is an angle between the stator flux and a rotor flux referred to as an axis of rotation of the rotor, wherein information about at least one of a desired motor torque and a reduced motor torque, which is smaller than the desired motor torque, is input to the load angle controller and the load angle controller calculates the measure of the load angle depending on an input motor torque;

combining the measure of the flux magnitude and the measure of the load angle to obtain a signal which is to be used to obtain commands for controlling electric currents of the electromagnets of the stator, thereby directly controlling the stator flux, repeatedly calculating a flux limit value which depends on a predetermined maximum value of the stator flux allowed for the motor, which depends on a maximum value of an electric voltage used to drive the currents through the stator electromagnets, and on an actual rotor speed, during acceleration of the rotor while the stator flux is smaller than a maximum flux allowed for the motor; calculating the measure of the flux magnitude depending on the output of a predetermined function, wherein an output of the predetermined function depends on the desired motor torque and corresponds to the magnitude of the stator flux, which results in the desired motor torque using a minimum possible stator current; and calculating the measure of the load angle depending on the desired motor torque.

2. The method of claim 1, wherein the synchronous motor is controlled during further acceleration of the rotor, when the stator flux has reached the maximum flux allowed for the motor by calculating the measure of the flux magnitude corresponding to the flux limit value; and calculating the measure of the load angle depending on the desired motor torque, so that the stator flux is kept constant at the maximum flux allowed for the motor and, while the desired motor torque is increasing, the load angle is also increasing.

3. The method of claim 1, wherein the synchronous motor is controlled during further acceleration of the rotor when a magnitude of the electric currents through the electromagnets of the stator have reached a predetermined maximum value by calculating the measure of the load angle depending on the reduced motor torque, so that the electric currents continuously match the predetermined maximum value and so that the load angle is increasing while the stator flux is decreasing.

4. The method of claim 3, wherein the synchronous motor is controlled during further acceleration of the rotor when the motor torque has reached a predetermined maximum value by calculating the measure of the load angle depending on the reduced motor torque, wherein the reduced motor torque is limited to the predetermined maximum value so that the electric currents are decreasing and so that the stator flux is decreasing.

5. The method of claim 3, wherein the synchronous motor is controlled during further acceleration of the rotor, while the desired motor torque is decreasing by calculating the measure of the flux magnitude corresponding to a constant flux value, and calculating the measure of the load angle depending on the desired motor torque, so that the stator flux is limited to the flux limit value and the load angle is decreasing.

6. The method of claim 3, wherein the synchronous motor is a propulsion motor of a rail vehicle and wherein the method is performed within the rail vehicle.

7. The arrangement of claim 1, wherein the arrangement is adapted to further accelerate the rotor when the stator flux has reached the maximum flux allowed for the motor by:
calculating the measure of the flux magnitude corresponding to the flux limit value; and
calculating the measure of the load angle depending on the desired motor torque, so that the stator flux is kept constant at the maximum flux allowed for the motor and, while the desired motor torque is increasing, the load angle is also increasing.

8. The arrangement of claim 1, wherein the arrangement is adapted to further accelerate the rotor of the synchronous motor when a magnitude of the electric currents through the electromagnets of the stator have reached a predetermined maximum value by:
calculating the measure of the load angle depending on the reduced motor torque, so that the electric currents continuously match the predetermined maximum value and so that the load angle is increasing while the stator flux is decreasing.

9. The arrangement of claim 8, wherein the arrangement is adapted to further accelerate the rotor of the synchronous motor when the motor torque has reached a predetermined maximum value by:
calculating the measure of the load angle depending on the reduced motor torque, wherein the reduced motor torque is limited to the predetermined maximum value so that the electric currents are decreasing and so that the stator flux is decreasing.

10. The arrangement of claim 8, wherein the arrangement is adapted to further accelerate the rotor, while the desired motor torque is decreasing by:
calculating the measure of the flux magnitude corresponding to a constant flux value, and
calculating the measure of the load angle depending on the desired motor torque so that the stator flux is limited to the flux limit value and the load angle is decreasing.

11. A propulsion system of a rail vehicle, wherein the arrangement of claim 1 is part of the propulsion system and is adapted to control a synchronous motor which is a propulsion motor of the rail vehicle.

12. An arrangement for operating a synchronous motor having a stator comprising a set of electromagnets and having a permanent magnet rotor, the arrangement comprising:
a flux controller for controlling the motor by calculating a measure of a flux magnitude, which is a magnitude of the stator flux of the motor;
a load angle controller for controlling the motor by calculating a measure of a load angle, which is the angle between the stator flux and a rotor flux referred to as an axis of rotation of the rotor, the load angle controller comprising: an input for receiving information about a motor torque, which is a desired motor torque or a reduced motor torque that is smaller than the desired motor torque, and wherein the load angle controller is adapted to calculate the measure of the load angle depending on an input motor torque;
a combination device for combining the measure of the flux magnitude and the measure of the load angle to obtain a signal which is to be used to obtain commands for controlling electric currents of the electromagnets of the stator, thereby directly controlling the stator flux.
a flux limit calculating device for repeatedly calculating a flux limit value which depends on a predetermined maximum value of the stator flux allowed for the motor, which depends on a maximum value of an electric voltage used to drive the currents through the stator electromagnets, and on an actual rotor speed,
wherein the arrangement is adapted to accelerate the rotor while the stator flux is smaller than a maximum flux allowed for the motor by:
calculating the measure of the flux magnitude depending on the output of a predetermined function, wherein the output of the predetermined function depends on the desired motor torque and corresponds to the magnitude of the stator flux, which results in the desired motor torque using a minimum possible stator current, and calculating the measure of the load angle depending on the desired motor torque.

* * * * *

UNITED STATES PATENT AND TRADEMARK OFFICE
CERTIFICATE OF CORRECTION

PATENT NO.       : 8,410,742 B2  
APPLICATION NO.  : 13/057819  
DATED            : April 2, 2013  
INVENTOR(S)      : Johann Galic Page 1 of 1

It is certified that error appears in the above-identified patent and that said Letters Patent is hereby corrected as shown below:

Title page, Column 2, Item (57) Abstract, Line 16, after "motor" delete ","

Title page, Column 2, Item (57) Abstract, Line 18, after "electromagnets" delete ","

Signed and Sealed this
Twelfth Day of November, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,410,742 B2
APPLICATION NO. : 13/057819
DATED : April 2, 2013
INVENTOR(S) : Johann Galic It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this

First Day of September, 2015

Michelle K. Lee
*Director of the United States Patent and Trademark Office*